United States Patent

Tanaka et al.

[11] Patent Number: 6,099,102
[45] Date of Patent: *Aug. 8, 2000

[54] INK JET RECORDING METHOD, RECORDING APPARATUS, AND INFORMATION-PROCESSING SYSTEM

[75] Inventors: Hideki Tanaka, Yokohama; Shinji Takagi, Kawasaki; Hiroyuki Hyotani, Tokyo, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/424,968

[22] Filed: Apr. 19, 1995

[30] Foreign Application Priority Data

Apr. 20, 1994 [JP] Japan .................................. 6-082046

[51] Int. Cl.[7] .................................. B41J 29/38
[52] U.S. Cl. .................................. 347/9
[58] Field of Search .................................. 347/9, 15, 37

[56] References Cited

U.S. PATENT DOCUMENTS

| | | | |
|---|---|---|---|
| 3,604,846 | 9/1971 | Behane et al. | 358/470 |
| 4,216,480 | 8/1980 | Buehner et al. | 346/75 |
| 4,313,124 | 1/1982 | Hara | 347/57 |
| 4,345,262 | 8/1982 | Shirato et al. | 347/10 |
| 4,459,600 | 7/1984 | Sato et al. | 347/47 |
| 4,463,359 | 7/1984 | Ayata et al. | 347/56 |
| 4,503,444 | 3/1985 | Tacklind | 347/11 |
| 4,558,333 | 12/1985 | Sugitani et al. | 347/65 |
| 4,608,577 | 8/1986 | Hori | 347/66 |
| 4,723,129 | 2/1988 | Endo et al. | 347/56 |
| 4,728,968 | 3/1988 | Hillmann et al. | 346/140 R |
| 4,740,796 | 4/1988 | Endo et al. | 347/56 |
| 4,746,935 | 5/1988 | Allen | 347/98 |
| 4,803,500 | 2/1989 | Milbrandt | 346/140 R |
| 4,827,282 | 5/1989 | Ritchie | 346/1.1 |
| 4,856,920 | 8/1989 | Sanders, Jr. | 400/124 |
| 5,007,003 | 4/1991 | Suzuki et al. | 364/519 |
| 5,018,884 | 5/1991 | Hirano et al. | 400/126 |
| 5,198,833 | 3/1993 | Kubota | 346/1.1 |
| 5,208,605 | 5/1993 | Drake | 346/1.1 |
| 5,252,986 | 10/1993 | Takaoka et al. | 346/1.1 |
| 5,559,930 | 9/1996 | Cariffe et al. | 395/102 |
| 5,610,637 | 3/1997 | Sekiya et al. | 347/10 |
| 5,657,060 | 8/1997 | Sekiya et al. | 347/15 |

FOREIGN PATENT DOCUMENTS

| | | |
|---|---|---|
| 0124190 | 11/1984 | European Pat. Off. . |
| 0247179 | 12/1987 | European Pat. Off. . |
| 0259541 | 3/1988 | European Pat. Off. . |
| 54-056847 | 5/1979 | Japan . |
| 57-160654 | 10/1982 | Japan . |
| 59-123670 | 7/1984 | Japan . |
| 59-138461 | 8/1984 | Japan . |
| 59-207265 | 11/1984 | Japan . |
| 60-071260 | 4/1985 | Japan . |
| WO87003363 | 6/1987 | WIPO . |

OTHER PUBLICATIONS

Bertschy, et al., "Ink Jet Printing Method", *IBM Technical Disclosure Bulletin,* vol. 24, No. 8, p. 4181, Jan. 1982.

Barraclough, "Obtaining Photographic–Quality Color Hard Copy With Continuous Ink–Jet Technology", *SID International Symposium Digest of Technical Papers,* vol. XX, pp. 184–186 and 439, May 1989.

*Primary Examiner*—Safet Metjahic
*Assistant Examiner*—Christopher Mahoney
*Attorney, Agent, or Firm*—Fitzpatrick, Cella, Harper & Scinto

[57] ABSTRACT

An ink jet recording method comprises a pixel-recording step for forming each pixel by fewer droplets than the number of droplets to be required for obtaining a gradation of an image. Therefore all of the pixels required for the image are recorded without removing any pixel from them.

58 Claims, 7 Drawing Sheets

FIG.5

| 0 | 1 | 1 | 3 | 3 | 2 |
|---|---|---|---|---|---|
| 0 | 0 | 1 | 2 | 1 | 2 |
| 1 | 1 | 1 | 1 | 1 | 2 |
| 0 | 0 | 0 | 1 | 2 | 1 |
| 0 | 0 | 0 | 1 | 2 | 1 |
| 0 | 0 | 0 | 2 | 3 | 3 |

FIG.6

| 0 | 1 | 1 | 1 | 1 | 1 |
|---|---|---|---|---|---|
| 0 | 0 | 1 | 1 | 1 | 1 |
| 0 | 1 | 1 | 1 | 1 | 1 |
| 0 | 0 | 0 | 0 | 1 | 1 |
| 0 | 0 | 0 | 1 | 1 | 1 |
| 0 | 0 | 0 | 1 | 1 | 1 |

FIG.7

| 0 | 1 | 1 | 2 | 2 | 2 |
|---|---|---|---|---|---|
| 0 | 0 | 1 | 2 | 2 | 2 |
| 0 | 1 | 1 | 1 | 1 | 2 |
| 0 | 0 | 0 | 1 | 2 | 1 |
| 0 | 0 | 0 | 1 | 2 | 2 |
| 0 | 0 | 1 | 2 | 2 | 2 |

INK JET RECORDING METHOD, RECORDING APPARATUS, AND INFORMATION-PROCESSING SYSTEM

BACKGROUND OF THE INVENTION

1. Field of the Invention

The present invention relates to an ink jet recording apparatus, and an ink jet recording method for recording information such as characters, images, and pictures on a recording medium. Also, the present invention relates to an information-processing system such as a copying machine, a facsimile machine, a printer, a word processor, and a personal computer, using such apparatus as its output device.

2. Description of the Related Art

Heretofore, various kinds of recording apparatuses for performing an image formation on a recording medium, for example, a sheet of recording paper, a piece of fabric, and a sheet of plastic material such as one used for an overhead projector (generally called as a OHP sheet in Japan) have been proposed as in the form of mounting a recording head in the type of wire dot matrix recording, thermal recording, thermal transfer recording, ink jet recording, or the like.

Among the conventional recording methods, the ink jet method has been known as one of the non-impact methods and mainly grouped into two different types from the points of how to prepare ink droplets and how to generate energies for ejecting them. That is, one is a continuous type, further grouped into a charge particle control type and a spray type; and another is on-demand type, further grouped into a piezo type, a spark type, and a bubble jet type.

In the case of the continuous type, a plurality of ink droplets are ejected continuously but only a required part of them is charged so as to be adhered on the recording medium while the others are of no use.

In the case of the on-demand type, on the other hand, ink droplets are ejected when they are required for the printing. Therefore, the ink can be used without causing any useless droplets and thus the internal parts of the ink jet apparatus are not stained. According to the on-demand type, furthermore, a response frequency of the recording means is lower than that of the continuous one because the on-demand type is able to start and stop the ink ejection. Therefore, the on-demand type realized a high speed printing by increasing the number of the orifices to be formed on the recording head.

Accordingly, many ink jet recording apparatuses being commercially available are provided as the on-demand type and thus they have been used as output devices of data-processing systems because of their high-density and high-speed recording behaviors. For example, the ink jet recording apparatuses have been provided as printers as output terminals of copying machines, facsimile machines, printing machines, word processors, work stations, or the like, or provided as handy- or portable-printers, personal computers, host computers, optical disc- or video-equipment, or the like. In general, furthermore, each ink jet recording apparatus can be constructed so as to meet the demand (for mechanical apply, business or private use, or the like) of each system described above, respectively.

The ink jet recording apparatus generally comprises: a carriage for carrying a recording means (i.e., a recording head) and an ink tank; a transfer means for transferring a recording medium (e.g., a sheet of recording paper); and a control means for controlling the drive of these means. During the recording period, the ink jet recording head moves along the direction (main-scanning direction) perpendicular to the direction (sub-scanning direction) of transmitting the recording medium for ejecting ink droplets from a plurality of ejection orifices. During the non-recording period, on the other hand, the recording medium is shifted at a distance corresponding to the recording width of the recording medium. Therefore, the ink jet recording method is responsible for ejecting ink droplets on the recording medium in accordance with the recording signals and has several advantages over the others in that it provides more excellent image qualities and performs the high-speed printing with a low-running cost. By using the recording head comprising a plurality of ink-ejecting nozzles being arranged in the sub-scanning direction, an image having a width corresponding to the number of the nozzles can be recorded by one scanning movement of the recording head in accordance with the ink jet method, resulting in that the high-speed printing is attained.

In the case of the ink jet recording apparatus for performing a color printing, furthermore, a colored image can be obtained by using droplets to be ejected from different recording heads corresponding to different colors, respectively, and placing one droplet upon another. In general, a recording apparatus capable of forming a full color image comprises recording heads and ink tanks which are corresponding to the number of color inks to be required. For example, the number of recording heads is three or four when three primary colors, i.e., yellow (Y), magenta (M), and red (R), or with black (B) are used, respectively. In resent years, the above kind of recording apparatus capable of forming a full color image with a recording head unit adapted to eject three or four kinds of ink has been put in practical use.

Besides, the ink jet recording apparatus easily records an image on a larger sized recording medium such as a sheet of A1 sized paper or the like. That is, a recording system for recording A1 sized color images, connecting with a device for reading an image to reproduce an original, such as a plotter (i.e., a printer used as an output device of the CAD system or the like), has been commercially available. Furthermore, there is a growing demand of applying the ink jet recording method in various fields. In the case of a presentation, for example, the ink jet recording method is applied in the process of recording an image on an OHP film to be projected for the presentation on a conference, a lecture, or the like. To meet the above demands, the ink jet recording apparatus has been developed and commercially manufactured to perform an excellent image formation without depending on a kind of the recording medium in spite of the fact that it is selected from the media having different properties of absorbing ink.

Accordingly, there is a sharp rise in demand of the ink jet recording method not only in the field of data-processing but also extensively in the field of using ink-supporting medium (e.g., a sheet of paper, an OHP sheet, or a sheet of cloth) to be given ink or the like, such as textile and clothing industries, as an outstanding recording means. In addition, an image with excellent qualities has been desired in every fields.

We are now explaining how to form a gradation (hereinafter, also referred as a gray level or a gray scale) of an image by the ink jet recording apparatus described above. For the gradation, several methods have been proposed, for example an area factor method in which the entire gray scale of an image is represented by one picture element of the plurality of picture elements consisting of only one of two levels of the scale in accordance with a predetermined threshold; a liquid droplet modification method (Japanese Patent Application Laid-open No. 59-207265 and Japanese Patent Application Laid-open No. 57-160654) in which the size of each droplet to be attached on the recording medium is changed by modifying the volume of liquid droplet; and a multi-droplet method in which a plurality of liquid droplets are successively ejected onto a same point to form one dot with a gradation thereof determined by the number of the droplets. Among these methods, however, the area factor method brings with a decline in the image-resolution, and also the liquid droplet modulation method cannot take a range of the gradation within the practical use, as for example, it is difficult to modify the volume of a liquid droplet. In the case of the multi-droplet method, on the other hand, it is possible to perform an image formation with a high-resolution and a high gradation by selectively using an ink jet recording head capable of ejecting smaller sized droplets compared with that of the other methods.

Next we are going to explain the image formation in accordance with the multi-droplet method, briefly. As already described above, each pixel of the image is formed by placing a plurality of droplets one on top of the other or on top of one another. In this case, a pixel formed by only one droplet is also used for the image formation.

After placing the liquid droplet on the recording medium, the liquid droplet requires over several hundred milliseconds of time to sink into the medium. As a result, a semicircular pattern of the permeation can be observed as a cross sectional view after placing the liquid droplet on the recording medium and thus a larger sized semicircular pattern is obtained by placing a subsequent droplet upon a prior droplet. Consequently, each size of the pixel can be individually determined by selecting the number of the droplets to be placed on the recording medium.

It is expected that the recording speed is decreased when the number of the droplets to be piled up is increased for obtaining a more extended extend range of the image's gradation. However, this problem can be solved by combining the several methods, such as the liquid droplet modification method described above and another method described in Japanese Patent Application Laid-open No. 63-502261 in which a plurality of droplets respectively having different volumes is ejected from nozzles of the ink jet head and piled on the recording medium within an extremely short time.

The recording process in accordance with the multi-droplet method will be explained in the following description.

FIG. 1 is a perspective illustration for explaining the construction of a recording head and its peripheral structure in the conventional ink jet recording apparatus.

The recording head 1 is mounted on a carriage 4 slidably engaged on guide shafts 5A and 5B. These shafts 5A and 5B serve to guide a shuttle movement of the carriage 4 in the direction of an arrow A (i.e., a main-scanning direction) in FIG. 1 with the aid of a driving means (not shown). Consequently, the recording head 1 is able to record an input image data on a recording medium 2 by its reciprocating motion in company with the carriage 4.

The recording head 1 has a plurality of orifices for ejecting ink droplets. In this example, thirty-two orifices are formed and arranged in the direction of transporting the recording medium 2, defined as a sub-scanning direction B perpendicular to the above direction A. In the arrangement, furthermore, the orifices are in close formation with the density of 400 dpi (dot per inch) and the distance of 63.5 µm between them.

Each orifice communicates with a corresponding ink path where a heater element is installed for generating thermal energy to be used for ejecting an ink droplet. That is, the heater element causes heat by receiving an electric pulse in accordance with the driving data. Then the heat causes a film-boiling phenomena in the ink to generate a bubble responsible for pushing a part of ink out from the orifice. In general, a driving frequency of the heater element (i.e., an ejection frequency) is 10 kHz. Furthermore, a size of each ink droplet can be determined so as to express a desired concentration with an optical density (OD) of 1.4 when three ink droplets are placed on the recording medium to form a pixel covering an area of 63.5 micrometers square. In this case, the image can be formed by four different types of pixels. That is, the number of droplets in one pixel takes a value selected from 0, 1, 2, and 3, corresponding to four levels of the gradation, respectively. Consequently, a substantial frequency for forming a pixel takes a value of 10/3 kHz as a result of using the recording head with the ejection frequency of 10 kHz for ejecting three ink droplets at the maximum to form one pixel.

As described above, the carriage 4 having the ink jet head 1 mounted thereon is guided by the guide shafts 5A and 5B to shift its position. The carriage's movement is performed with the aid of a timing belt having a part fixed with the carriage 4. The timing belt is being pulled by a pair of pulleys to be driven by a rotation of a motor (not shown).

An ink tube 6 is connected with the recording head 1 to supply ink from an ink tank (not shown), while a flexible cable 7 is connected with the recording head 1 having a head-driving circuit (a head driver) that receives a driving signal and a control signal according to recording data from a host system or an internal control unit through the cable. It is noted that these constituents 6 and 7 are made of flexible materials so as to follow in the movement of the carriage 4.

A platen roller 3 is in the type of a rolling cylinder having a longitudinal axis parallel to the guide shafts 5A and 5B. The platen roller 3 is driven by a sheet-feeder motor (not shown) to feed a sheet of recording paper 2 provided as the recording medium and is responsible for positioning and holding a recording surface thereof. Accompanying with the movement of the carriage, subsequently, the recording head 1 ejects ink droplets onto the recording surface facing the orifices.

FIG. 2 is a block diagram for explaining a control mechanism of the ink jet recording apparatus shown in FIG. 1.

A main controller 112 comprises a central processing unit (CPU) and the like to store image data (8 bit and 256 level gradation for each pixel) from a host computer 111 into a frame memory 113. With a predetermined timing, the main controller 112 transfers the image data corresponding to each pixel from the frame memory 113 to a drive data RAM 115 through a halftoning unit 114, resulting that the frame memory 113 stores the image data. In the halftoning unit 114, the image data corresponding to each pixel is converted into four-level (quaternary) data (2 bit for each pixel, 0–3 levels of the gray scale). The halftoning unit realizes an algorithm known as a area factor method or an error-diffusion method by means of an electric circuit. According to a control signal from the main controller 112, the driver controller 116 reads drive data stored in the drive data RAM 115 with respect to a series of numbers used for identifying orifices of the recording head 1. Then the read data is supplied into a head driver 117 to control its drive timing.

According to the above construction, the main controller 112 controls the events of: an ink ejection by the recording head 1 through the driver controller 116; a revolution of the carriage motor 121 through the carriage motor driver 119; and a revolution of the sheet feeding motor 122 through 122 the sheet feeding driver 120, to successively record characters, pictures, drawings, or the like on the recording paper 2 in according with the image data.

By the way, the recording apparatus is driven by one of several printing modes. However, this kind of printing control is not limited in the multi-droplet method but also other methods. A high speed printing mode that is called a draft mode (or an ink saving mode) has been used when the user verifies the printed image or performs other purpose. That is, the draft mode may be selected when the user requires a printing result as soon as possible by performing a higher speed printing compared with that of the normal mode, when the user requires only a printing result as an unimportant output, or when the user requires saving the ink.

FIG. 3 is a schematic illustration for explaining an image recording under the draft mode in accordance with a conventional ink jet recording method. In the figure, reference numerals from #1 to #32 indicate orifices of the recording head 1, respectively, while reference numeral 500 indicates an area of the recording medium. The recording head 1 moves in the direction of an arrow A'. As shown in the figure, the draft mode is responsible for thinning down the overwhelming number of pixels in the image to carry out the high speed printing. In the figure, each pixel is not formed by two or more ink droplets (i.e., it is not depended on the multi-droplet method) but is formed by one droplet at the maximum. That is, each pixel is printed as a result of binarized image data, so that it is formed by ejecting one droplet or not.

The following description is for explaining why the printing speed is improved by thinning down the overwhelming number of pixels in the binarized image.

In FIG. 3, the image 500 consists of a plurality of rows (L1–L32) each made up of a series of pixels placed next to each other so as to form a checkered pattern. In the figure, an open square represents a pixel where an ink droplet cannot be placed; and a crosshatch square represents a pixel where an ink droplet can be placed when the image data is provided.

During the recording procedure, the recording head ejects an ink droplet onto a checkered pattern's point (i.e., a pixel indicated by the crosshatch square in the figure) on the recording medium when the drive data is provided. However, the recording head does not eject any ink droplet onto adjacent checkered pattern's point (i.e., a pixel indicated by the open square in the figure) on the recording medium in spite of receiving the drive data. In the case of an orifice #1 of the recording head 1, for example, an ink droplet can be ejected onto a pixel #501 when the drive data is provided while it cannot be ejected when the drive data is not provided. On the other hand, a pixel #502 adjacent to the pixel #502 cannot receive any ink droplet regardless of receiving the drive data or not. Just as in the case of the pixels #501 and #502, furthermore, an ink droplet can be ejected onto a pixel #503 when the drive data is provided while it cannot be ejected when the drive data is not provided. On the other hand, a pixel #504 adjacent to the pixel #503 cannot receive any ink droplet regardless of receiving the drive data or not. Consequently, the orifice #501 ejects ink droplets on alternate pixels in the row L1 to form a series of pixels as a checkered pattern, regardless of receiving the drive data or not. Also, the other orifices performs the same recording as that of the orifice #501, so that they eject ink droplets on alternate pixels in their row to each form a series of pixels as a checkered pattern, regardless of receiving their drive data or not. By the way, the recording head has a heater's drive frequency (i.e., an ejection frequency) of 10 kHz. Therefore, each orifice may be 10 kHz in ejection frequency for two pixels when the draft mode corresponding to a binary image is performed. That is, the recording head 1 performs a recording movement two times faster as that of the standard, so that a speed of printing is improved.

However, if the pixels are thinned out to form a checkered pattern as shown in FIG. 3, pixels to be recorded are half of all of the pixels, so that it is difficult to make out characters or the like in the obtained image. As a matter of fact, the obtained image can be only used for roughly observing a layout of the paper and thus it comes to nothing or wastes the time of printing.

In the case of the multi-droplet method, in addition, a substantial increase of the printing speed cannot be attained because the recording head ejects a plurality of ink droplets on each pixel in spite of thinning out pixels to form a checkered pattern as shown in FIG. 3. Therefore, it is difficult to raise the ejection frequency of each nozzle, so that the printing speed cannot be increased.

SUMMARY OF THE INVENTION

An object of the present invention is to provide an ink jet recording method enabling to perform a high-speed printing and to provide a high-quality print, an ink jet recording apparatus using such method, and an image-processing system using such apparatus as an output device thereof.

Another object of the present invention is to provide an ink jet recording method using a multi-droplet procedure to perform a high-quality draft mode recording with a predetermined gradation, an ink jet recording apparatus using such method, and an image-processing system using such apparatus as an output device thereof.

In a first aspect of the present invention, there is provided an ink jet recording method for recording an image consisting of a plurality of pixels on a recording medium by using a recording means that ejects at least one ink droplet to form one pixel on the recording medium, where the image is a multi-leveled image having a gradation which is determined by the number of ink droplets placed in the pixel on the recording medium, comprising:

a normal pixel recording step for forming the image in a normal mode that uses the number of ink droplets for each pixel to be required for obtaining the gradation; and a draft pixel recording step for forming an image in a draft mode that uses fewer ink droplets than the number of ink droplets for each pixel to be required for obtaining the gradation.

The pixel may be formed by one fewer ink droplets than the number of ink droplets to be required for obtaining the gradation in the draft mode.

All of the plurality of pixels in the image may be recorded on the recording medium by the draft pixel recording step.

A predetermined part of the pixels in the image may be recorded on the recording medium by the draft pixel recording step.

The draft pixel recording step may include:

a first draft mode for forming the pixel by one fewer ink droplets than the number of the ink droplets to be required for obtaining the gradation; and a second draft mode for forming the pixel by two fewer ink droplets than the number of the ink droplets to be required for obtaining the gradation, wherein the first draft mode and the second draft mode are selectively performed.

The draft pixel recording step may include:

a first draft mode for forming the pixel by one fewer ink droplets than the number of the ink droplets to be required for obtaining the gradation;

a second draft mode for forming the pixel by two fewer ink droplets than the number of the ink droplets to be required for obtaining the gradation; and a third draft mode for recording a predetermined part of the pixels in the image during the course of performing the first or second mode in the pixel-recording step, wherein the first draft mode, the second draft mode, and the third draft mode are selectively performed.

The draft pixel recording step may be performed when a draft mode printing is selected.

A rate of shifting a position of the recording medium may be determined in accordance with the number of the fewer ink droplets.

The recording means may be an ink jet recording head that employs an electrothermal transducer for ejecting ink droplets by generating a film boiling in ink by thermal energy, as means for generating energy for ejecting ink droplets.

The recording means may eject ink droplets of different inks corresponding to different colors, respectively.

In a second aspect of the present invention, there is provided a printed product obtained by performing an ink jet recording method for recording an image consisting of a plurality of pixels on a recording medium by using a recording means that ejects at least one ink droplet to form one pixel on the recording medium, where the image is a multi-leveled image having a gradation determined by the number of ink droplets placed in the pixel on the recording medium, the ink jet recording method comprising:

a normal pixel recording step for forming the image in a normal mode that uses the number of ink droplets for each pixel to be required for obtaining the gradation; and a draft pixel recording step for forming the image in a draft mode that uses fewer ink droplets than the number of ink droplets for each pixel to be required for obtaining the gradation.

In a third aspect of the present invention, there is provided an ink jet recording apparatus using an ink jet recording method for recording an image consisting of a plurality of pixels on a recording medium by using a recording means that ejects at least one ink droplet to form one pixel on the recording medium, where the image is a multi-leveled image having a gradation determined by the number of ink droplets placed in the pixel on the recording medium, the ink jet recording method comprising:

a normal pixel recording step for forming the image in a normal mode that uses the number of ink droplets for each pixel to be required for obtaining the gradation; and a draft pixel recording step for forming the image in a draft mode that uses fewer ink droplets than the number of ink droplets for each pixel to be required for obtaining the gradation.

The pixel may be formed by one fewer ink droplets than the number of the ink droplets to be required for obtaining the predetermined gradation in the draft mode.

All of the pixels in the image may be recorded on the recording medium by the draft pixel recording step.

A part of the pixels in the image may be recorded on the recording medium by the pixel-recording site.

The pixel recording step may include:

a first mode for forming the pixel by one fewer ink droplets than the number of the ink droplets to be required for obtaining the gradation; and a second mode for forming the pixel by two fewer droplets than the number of the droplets to be required for obtaining the gradation, which are selectively performed.

The draft pixel recording step may include:

a first mode for forming the pixel by one fewer ink droplets than the number of the ink droplets to be required for obtaining the gradation;

a second mode for forming the pixel by two fewer ink droplets than the number of the ink droplets to be required for obtaining the gradation; and a third mode for recording a predetermined part of the pixels in the image during the course of performing the first or second mode in the pixel-recording step, which are selectively performed.

The pixel-recording step may be performed when a draft mode printing is selected.

A speed of shifting a position of the recording medium may be determined in accordance with the number of the fewer droplets.

The recording means may be an ink jet recording head that employs an electrothermal transducer for ejecting ink droplets by generating a film boiling in the ink by thermal energy, as means for generating energy for ejecting ink.

The recording means may eject ink droplets of different inks corresponding to different colors, respectively.

In a fourth aspect of the present invention, there is provided an information-processing system using an ink jet recording apparatus having a transfer means for transferring a recording medium and a recording means for performing an ink jet recording method for recording an image consisting of a plurality of pixels on a recording medium by ejecting at least one ink droplet to form one pixel on the recording medium, where the image is a multi-leveled image having a gradation determined by the number of ink droplets placed in the pixel on the recording medium, the ink jet recording method comprising:

a normal pixel recording step for forming the image in a normal mode that uses the number of ink droplets for each pixel to be required for obtaining the gradation; and a draft pixel recording step for forming the image in a draft mode that uses fewer ink droplets than the number of ink droplets for each pixel to be required for obtaining the gradation.

The pixel may be formed by one fewer ink droplets than the number of the ink droplets to be required for obtaining the gradation in the draft mode.

All of the pixels in the image may be recorded on the recording medium by the draft pixel recording step.

A predetermined part of the pixels in the image may be recorded on the recording medium by the draft pixel recording step.

The pixel recording step may include:

a first mode for forming the pixel by one fewer ink droplets than the number of the ink droplets to be required for obtaining the gradation; and a second mode for forming the pixel by two fewer ink droplets than the number of the ink droplets to be required for obtaining the gradation, which are selectively performed.

The pixel recording step may include:
a first mode for forming the pixel by one fewer ink droplets than the number of the ink droplets to be required for obtaining the gradation;
a second mode for forming the pixel by two fewer ink droplets than the number of the droplets to be required for obtaining the gradation; and
a third mode for recording a predetermined part of the pixels in the image during the course of performing the first or second mode in the draft pixel recording step, which are selectively performed.

The draft pixel recording step may be performed when a draft mode printing is selected.

A velocity of shifting a position of the recording medium may be determined in accordance with the number of the fewer ink droplets.

The recording means may be an ink jet recording head that employs an electrothermal transducer for ejecting ink droplets by generating a membrane boiling in the ink by thermal energy, as means for generating energy for ejecting ink.

In a fifth aspect of the present invention, there is provided an ink jet recording method for forming a multilevel image composed of a plurality of pixels on a recording medium, each of the pixels is formed by at least one ink droplets comprising the steps of:
providing a recording head for ejecting ink;
inputting recording data including gray level data;
allocating the number of ink droplets for each pixel in accordance with the inputted recording data including the gray level data, in which the maximum number of ink droplets to be allocated is N (>1); and
forming image by constituting each pixel by ejecting the ink droplets from the recording head during the period of performing a scanning movement of the recording head against the recording head, wherein
the image-forming step has:
a normal mode for forming the multilevel image by constituting each pixel by ejecting ink droplets from the recording head, in which the number of the ink droplets is being allocated in the allocating step; and
a draft mode for forming the multilevel image by constituting each pixel by ejecting ink droplets from the recording head, in which the number of the ink droplets is fewer than the maximum number N.

The allocating step may allocate ink droplets for each pixel in the draft mode, in which the number of the ink droplets is fewer than the maximum number N, and the image-forming step forms the multilevel image by each pixel constituted by the ink droplets numbered by the allocating step.

The allocating step may allocate ink droplets for each pixel according to the draft mode, in which the number of the ink droplets is one fewer than the maximum number N.

The allocating step may allocate ink droplets for each pixel according to the draft mode, in which the number of the ink droplets is two fewer than the maximum number N.

The allocating step may allocate ink droplets for each pixel according to one draft mode selected from:
a first draft mode for allocating ink droplets, in which the number of the ink droplets is one fewer than the maximum number N; and
a second draft mode for allocating ink droplets, in which the number of the ink droplets is two fewer than the maximum number N.

The image-forming step may perform a scanning movement of the recording head in the draft mode at a higher speed compared with a scanning movement of the recording head in the normal mode.

The image-forming step may perform a scanning movement of the recording head at a speed corresponding to the maximum number of ink droplets to be allocated for each pixel.

The recording head may eject ink by using a thermal energy.

The recording head may eject a plurality of inks.

In a sixth aspect of the present invention, there is provided an ink jet recording apparatus using a recording head that ejects ink to form a multilevel image composed of a plurality of pixels on a recording medium, in which each pixel is formed by at least one ink droplets, comprising:
an input means for inputting a recording data including a gray level data;
a N+1 leveling means for allocating the number of ink droplets for each pixel in accordance with the inputted recording data including the gray level data, in which the maximum number of ink droplets to be allocated is N (>1);
a scanning means for performing a scanning movement of the recording head against the recording head; and
an image forming means for forming the multilevel image by constructing each pixel by ejecting ink droplets from the recording head during the scanning period of performing a scanning movement of the recording head by the scanning means, wherein
the image-forming means performs the image formation in a mode selected from:
a normal mode for forming the multilevel image by constituting each pixel by ejecting ink droplets from the recording head, in which the number of the ink droplets is being allocated by the N+1 leveling means; and
a draft mode for forming the multilevel image by constituting each pixel by ejecting ink droplets from the recording head, in which the number of the ink droplets is fewer than the maximum number N.

An ink jet recording apparatus may further comprise:
a M+1 leveling means for allocating the number of ink droplets for allocating the number of ink droplets for each pixel in accordance with the inputted recording data including the gray level data, in which the maximum number of ink droplets to be allocated is M (<N), wherein
the image forming means forms the multilevel image by constituting each pixel by ejecting ink droplets from the recording head, in which the number of the ink droplets is being allocated by the M+1 leveling means.

The M may be equal to N–1.
The M may be equal to N–2.
The M may be equal to 1.

An ink jet recording apparatus may further comprise:
a mask means for masking the ink droplets allocated for each pixel to be formed by the image forming means.

A scanning rate of the scanning means may be consistent with a predetermined speed in accordance with the maximum number of ink droplets which is allocated for each pixel to be formed by the image forming means.

The recording head may eject ink by using a thermal energy.

The recording head may eject a plurality of inks.

The recording head may be removably mounted.

An ink jet recording apparatus may further comprise:

a carriage on which the recording head is mounted.

An ink jet recording apparatus may further comprise:

a transfer means for shifting the position of the recording medium to be recorded by the recording head.

The recording apparatus may be applied to a copying machine.

The recording apparatus may be applied to a facsimile machine.

The recording apparatus may be applied to a terminal of a computer.

The above and other objects, effects, features and advantages of the present invention will become more apparent from the following description of embodiments thereof taken in conjunction with the accompanying drawings.

BRIEF DESCRIPTION OF THE DRAWINGS

The present invention is illustrated in the following drawings in which:

FIG. 5 is a block diagram which shows another embodiment of a control mechanism to be applied in an ink jet recording apparatus in accordance with the present invention;

FIG. 6 is a block diagram which shows an embodiment of a sequence of limiting a printing mode of an ink jet recording method in accordance with the present invention;

FIG. 7 is a block diagram which shows an embodiment of image data to be used in an ink jet recording method in accordance with the present invention (normal mode);

DETAILED DESCRIPTION OF PREFERRED EMBODIMENTS

The present invention will now be described in detail hereinafter with reference to the accompanying drawings, i.e., FIG. 4 to FIG. 9 which illustrate preferred embodiments thereof. In the figures, same reference numbers denote same constituents.

Figure 4:
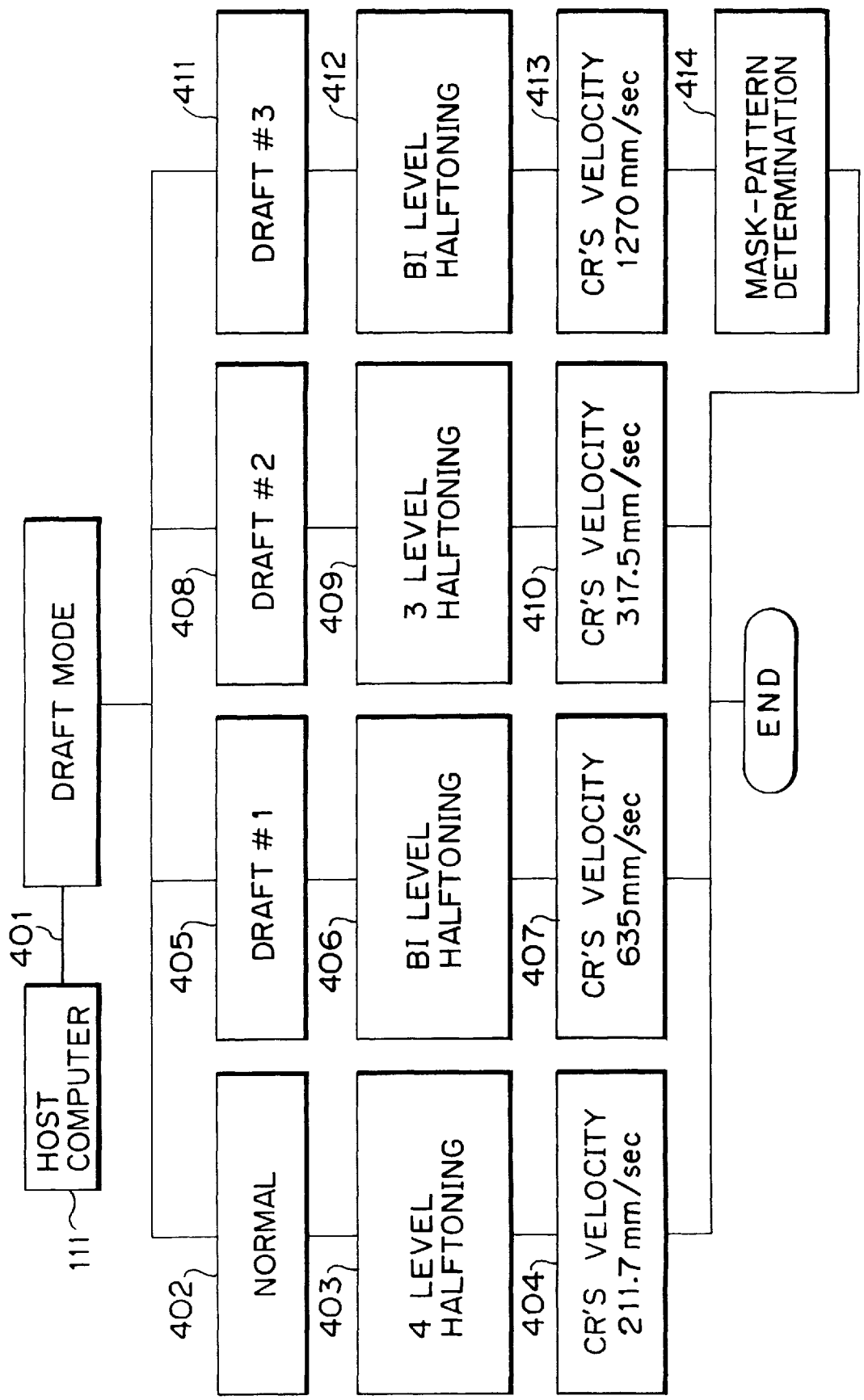
FIG. 4 is a block diagram which shows a preferable embodiment of a control mechanism to be applied in an ink jet recording apparatus in accordance with the present invention.

FIG. 4 is a block diagram for explaining a sequence of determining a print mode in accordance with an ink jet recording method of the present invention.

According to the present invention, an image is formed by using a fewer number of droplets, preferably one fewer droplets, compared with the number of droplets to be required for obtaining a predetermined level of a gray scale (hereinafter also referred as a gradation). In this case, however, all of the smallest image-forming units (i.e., pixels) are printed on the recording medium. More specifically, for example, a main controller of an ink jet recording apparatus receives a print command 401 from a host computer 111 connected with an ink jet recording apparatus. The main controller judges whether the print command 401 is of a normal mode or one of draft modes #1, #2, and #3 which are functionally related with one of halftoning units 403, 406, 409, and 412. Then the main controller initializes the conditions of a drive controller and a motor driver respectively, through one of the halftoning units, according with the selected mode. The driver controller and the motor driver are responsible for controlling a recording movement of the recording means.

The details of each initial condition mentioned above is as follows. That is, each halftoning unit is initialized so as to perform a bi-level (binary), 3-level (ternary), or 4-level (quaternary) halftoning; the driver controller is initialized so as to print one pixel by one droplet; and the carriage motor driver is initialized for determining a velocity of the carriage (CR) in accordance with contents of the draft mode. By using the draft mode, accordingly, all of the pixels in the image can be printed on the recording medium by means of the ink jet recording apparatus of the present invention.

In FIG. 4, there are several modes which can be selected as the draft mode. That is, a normal mode (normal), a first mode (draft #1), a second mode (draft #2), and a third mode (draft #3). Examples of the image data corresponding to these modes are represented in FIGS. 5 to 7, respectively. That is, FIG. 5 is a 4-level image data corresponding to the normal mode, FIG. 6 is a bi-level image data corresponding to the first or third mode, and FIG. 7 is a 3-level image data corresponding to the second mode.

As shown in the figures, each mode determines the type of the halftoning and an individual CR's velocity. That is, (i) when the normal mode 402 is selected, the 4-level halftoning (the maximum number of ink droplets to be ejected for each pixel is three) is performed at the CR's speed of 211.7 mm/second (404);

(ii) when the first draft mode 402 is selected, the bi-level halftoning (the maximum number of ink droplet to be required for each pixel is one) is performed at the CR's speed of 635 mm/second (407), which is three times as high as that of the normal mode;

(iii) when the second mode is selected, the 3-level halftoning (the maximum number of ink droplets to be ejected for each pixel is two) is performed at the CR's speed of 317.5 mm/second (410), which is one-and-a-half times as high as that of the normal mode; and (iv) when the third draft mode is selected, the bi-level halftoning is performed at CR speed of 1270 mm/second, which is six times as high as that of the normal mode.

In the case of the third draft mode, furthermore, a mask pattern creation is also performed.

Comparing with the conventional method, therefore, the images of characters and the like obtained by the method of the present invention can be more clearly discriminated. The image can be printed more speedily and a quality of the print is improved, compared with that of the conventional one. It is noted that an extremely high speed printing can be attained by decreasing more the number of the droplets to be placed on the recording medium and the user saves the total ink volume.

The following embodiments 1 and 2 are more detailed descriptions with respect to preferred embodiments of the ink jet recording apparatus that performs the above modes.

<Embodiment 1>

Figure 8:
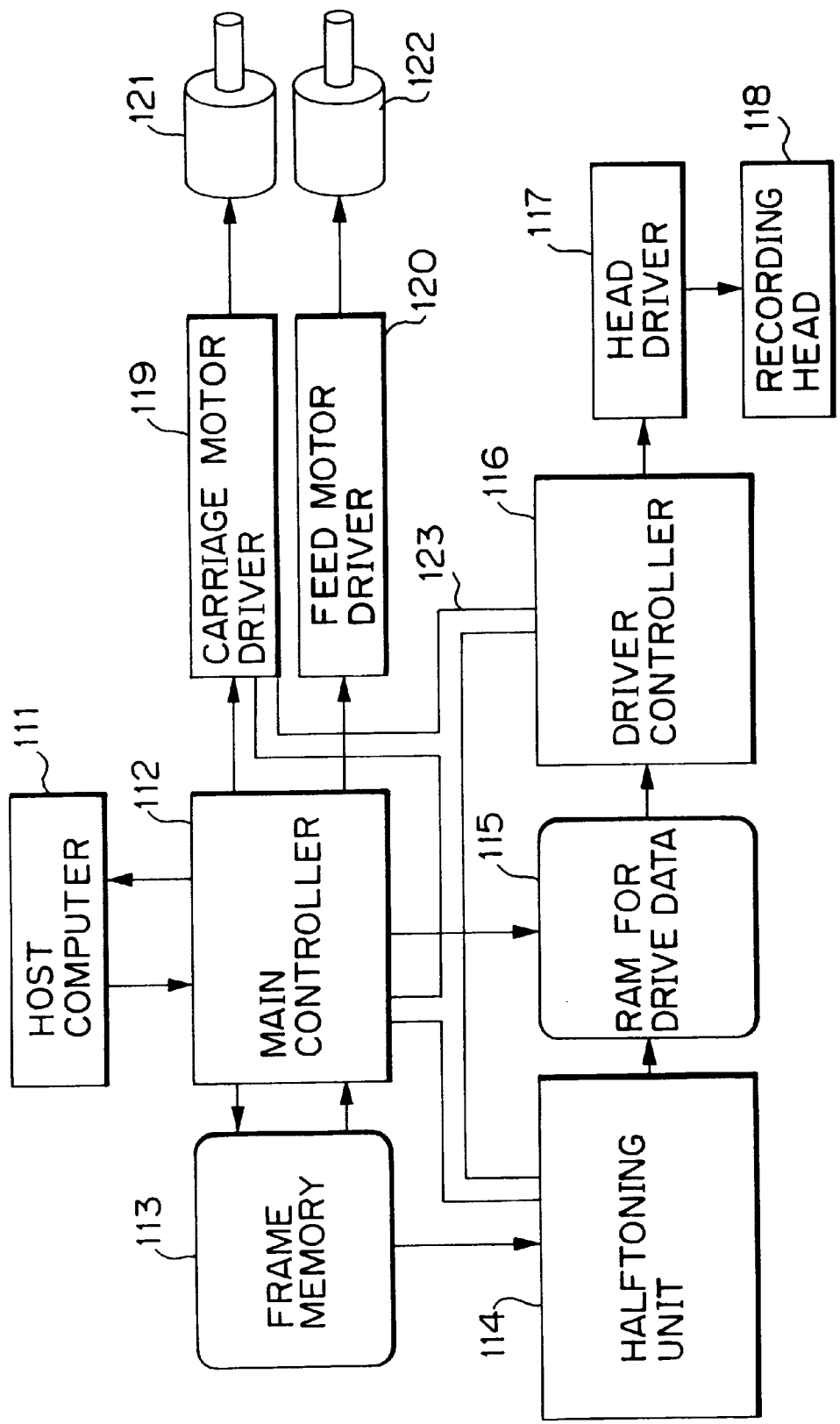
FIG. 8 is a block diagram which shows an embodiment of image data to be used in an ink jet recording method in accordance with the present invention (draft modes #1 and #3)

FIG. 8 is a block diagram for explaining a control mechanism of the ink jet recording apparatus that performs a multi-droplet process in accordance with the present invention.

A main controller 112 comprises a central processing unit (CPU) and the like to house image data (8 bit and 256-levels of gray scale for one pixel) from a host computer 111 into a frame memory 113. With a predetermined timing, the main controller 112 transfers the image data corresponding to each pixel from the frame memory 113 to a drive data RAM 115 through a halftoning unit 114, resulting that the image data is stored in the frame memory 113. In the halftoning unit 114, the image data (256 levels) corresponding to each pixel is converted into the data selected from 4-level data (0–3 levels for each pixel), 3-level data (0–2 levels for each pixel), and bi-level data (0–1 levels for each pixel). That is, one mode is selected from the group of the normal mode, the first draft mode #1, and the second draft mode #2, which are shown in FIG. 4. In this embodiment, the maximum number of ink droplets to be ejected for each pixel is three. The halftoning unit is provided as a unit for realizing an algorithm known as a area factor method or an error-difusion method by means of an electric circuit. According to a control signal from the main controller 112, the driver controller 116 reads drive data stared in the drive date RAM 115 with respect to a series of numerals used for identifying orifices of the recording head 118. Then the read data is supplied into a head driver 117 to control its drive timing.

Figure 1:
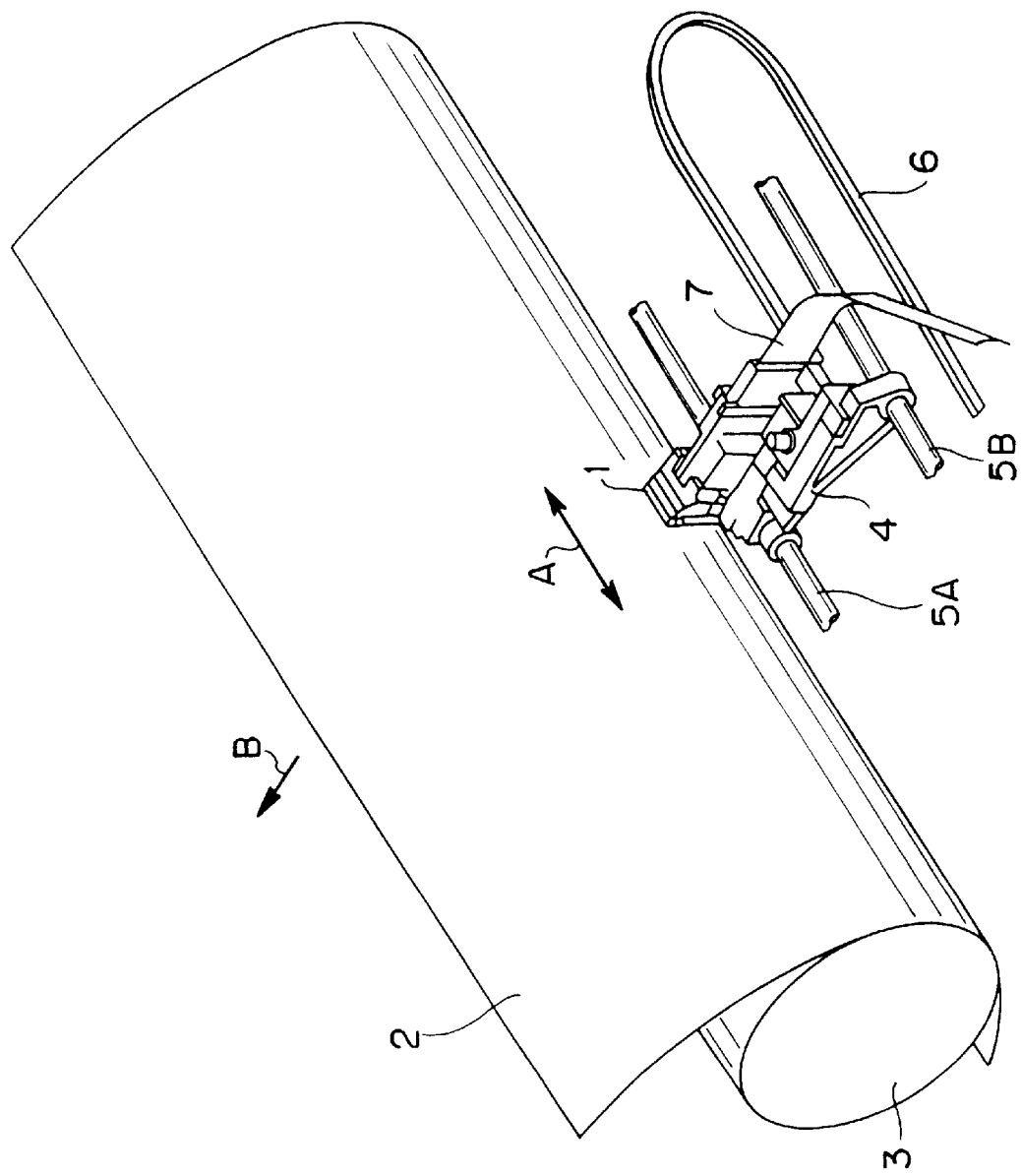
FIG. 1 is a perspective view which schematically shows the structure of an ink jet recording apparatus.
Figure 2:
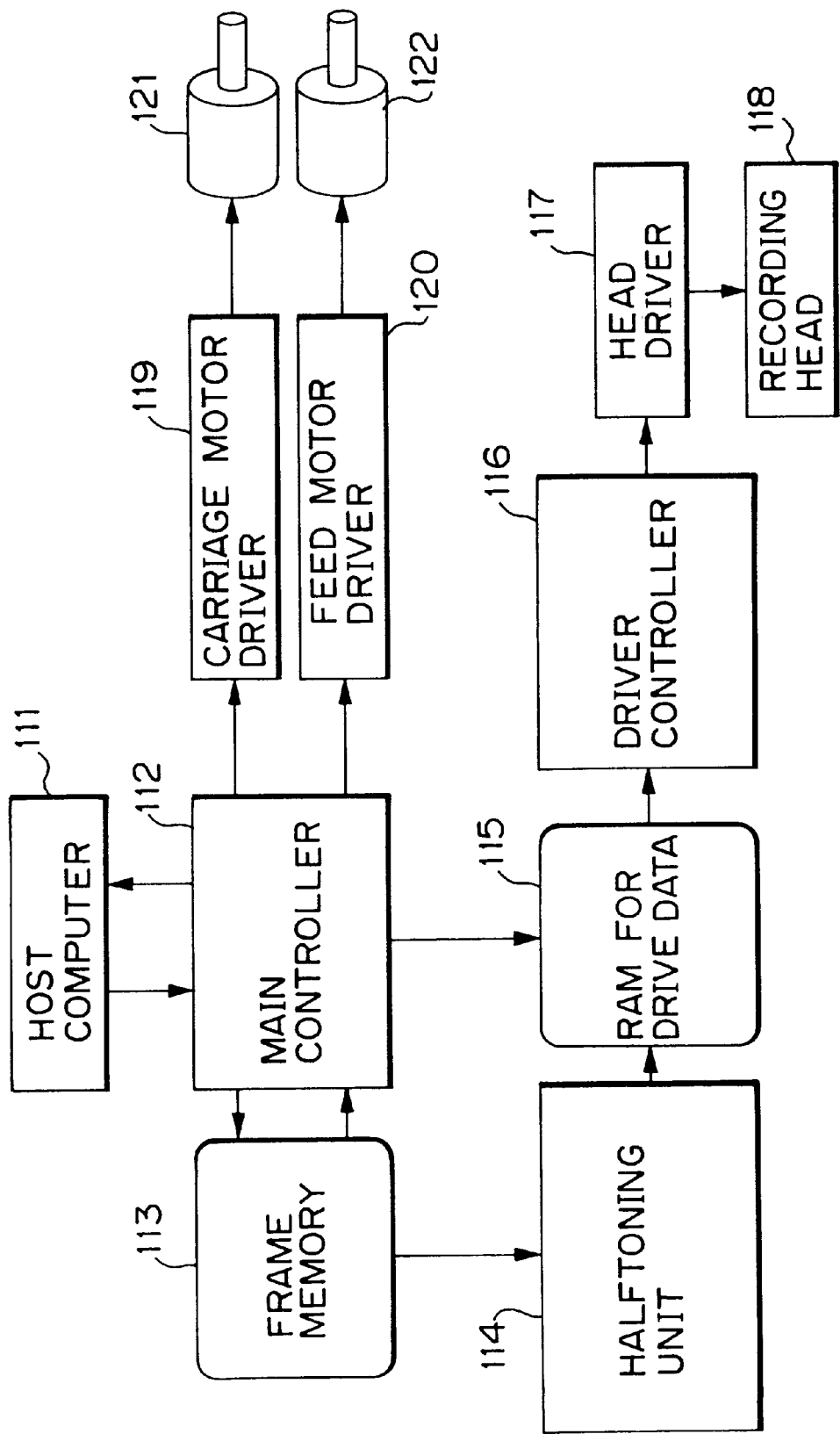
FIG. 2 is a block diagram which shows an embodiment of a control mechanism to be applied in the ink jet recording apparatus.
Figure 3:
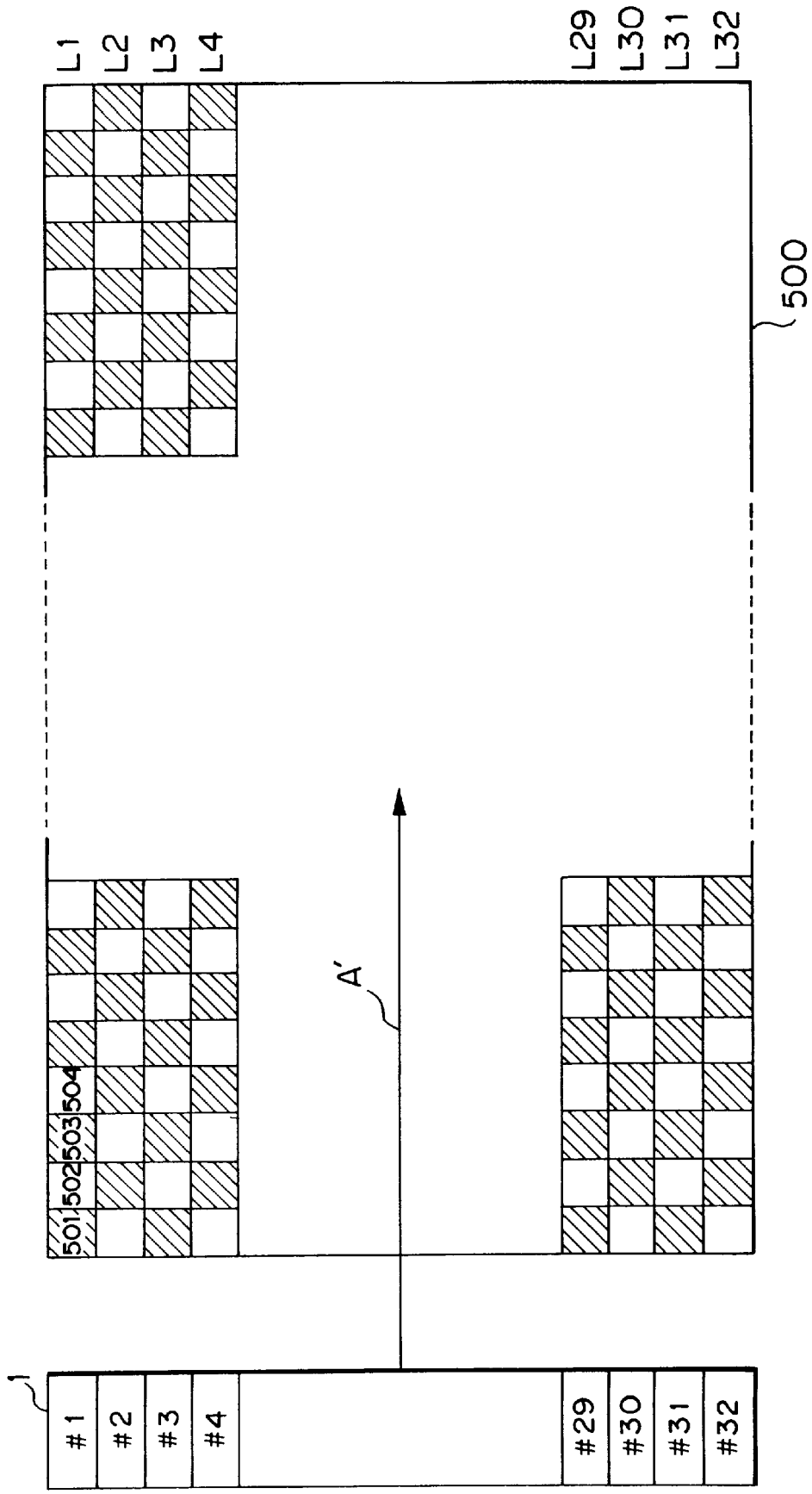
FIG. 3 is a schematic illustration for explaining an image recording in accordance with an ink jet recording method.

According to the above construction, the main controller 112 controls the events of:

(i) an ink ejection by the recording head 118 through the driver controller 116;

(ii) a revolution of the carriage motor 121 through the carriage motor driver 119; and (iii) a revolution of the sheet feeding motor 122 through 122 the sheet feeding driver 120, to successively print characters, pictures, drawings, or the like on the recording medium (e.g., a sheet of recording paper 2 as shown in FIG. 1) in accordance with the image data.

In the case that, for example, an instruction of printing the image with the high-speed printing mode (i.e., the draft mode) is provided from the host computer 111 to the main controller 112, the following events occur. As shown in FIG. 4, the high-speed printing mode is the first or second draft mode #1 or #2. Within the two, the first mode #1 performs the highest speed printing, so that the data corresponding to the first draft mode #1 is used in the present embodiment. Depending on the first draft mode #1, the main controller 112 sends instructions to the components to specify their initial conditions. That is, (i) an instruction of performing a bi-level halftoning (0–1 level gradation for each pixel) is provided to the halftoning unit 114;

(ii) an instruction of performing a printing movement (one droplet for each pixel) is provided to the driver controller 116; and (iii) an instruction of moving the carriage at a three-times higher printing speed compared with that of the normal one to the carriage motor driver 119 (i.e., a printing rate of about 635 mm/second which is three times higher than the normal speed of about 211.7 mm/second because of the normal condition by which three droplets are provided in 400 dpi with a frequency of 10 kHz per each droplet).

As shown in FIG. 8, these instructions for the initial conditions are provided from the main controller 112 through a control line 123.

A printing process and a data processing process in the condition of using the above first draft mode #1 will be now described.

At first, the host computer 111 sends an instruction of using the first draft mode #1 for the print to initialize the main controller 112. After the initialization, the main controller 112 sends a signal of requiring print data to the host computer 111. The print data may be image data (individual data corresponding to each pixel) and/or code data such as characters. It is possible to use the print data as a command of ending the print. In this embodiment, the print data is provided as image data that consists of individual data corresponding to each pixel. That is, the main computer 111 transfers 8 bit (256-level gradation) data per pixel in order along an image raster direction to the main controller 112. The frame memory 113 stores each pixel data in a raster unit for a while. Then the main controller 112 transfers the data stored in the frame memory 113 to the halftoning unit 114 for every pixel. In this unit 114, the bi-level halftoning is performed in accordance with the parameters in the initial set-up, and then 1 bit data per each pixel is transferred into the drive data RAM 115. When the print data corresponding to the number of the nozzles of the recording head (in this embodiment, 32 nozzles) is stored in the drive data RAM 115, the main controller 112 concludes that a printing movement is being ready to start and then it sends print instructions into each device. According to the print instructions, the carriage motor driver 119 is initialized so as to shift the CR's position at a rate of 635 mm/second. On the other hand, the driver controller 116 is initialized so as to perform the steps of: reading 1 bit data for one pixel from the drive data RAM; transferring 1 bit data for one pixel into the recording head; and providing one heat pulse for one pixel to the orifice. In the present embodiment, that is, the carriage moves at a speed as three times as high as that of the normal one, on the other hand the image is formed by ejecting one droplet for printing each pixel that originally requires three droplets. Consequently, the printed image is of a lower concentration compared with that of the normal printing but no defects, because of comprising all pixels required for the entire image. In the case of printing characters, particularly, it is possible to read the result because all of the pixels constituting the entire character's structure is provided In accordance with the present invention, as described above, the printing process comprises the steps of ejecting the ink droplets corresponding to all of the pixels to be required for the image printing, so that the output image can be sufficiently allowable for the users in spite of being obtainable at a printing rate about three times higher than that of the normal one.

In the present embodiment, the halftoning unit 114 sets up the drive data against the bi-level data. However, it is also possible to picture the print data such as fonts against the drive data RAM 115. In the present embodiment, furthermore, the recording head is conditioned so as to eject one droplet for one pixel but is not limited thereto, because it can be satisfied when the number of such droplets is three or less. Therefore, it is also possible to use two or three droplets for one pixel. For embodiment, the second draft mode #2 for ejecting two ink droplets at maximum can be used under the condition of using the 3-level halftoning in the halftoning unit 114 with the CR's velocity of 317.5 mm/second. Accordingly, the printing speed can be determined by the number of droplets to be ejected for each pixel.

<Embodiment 2>

Figure 9:
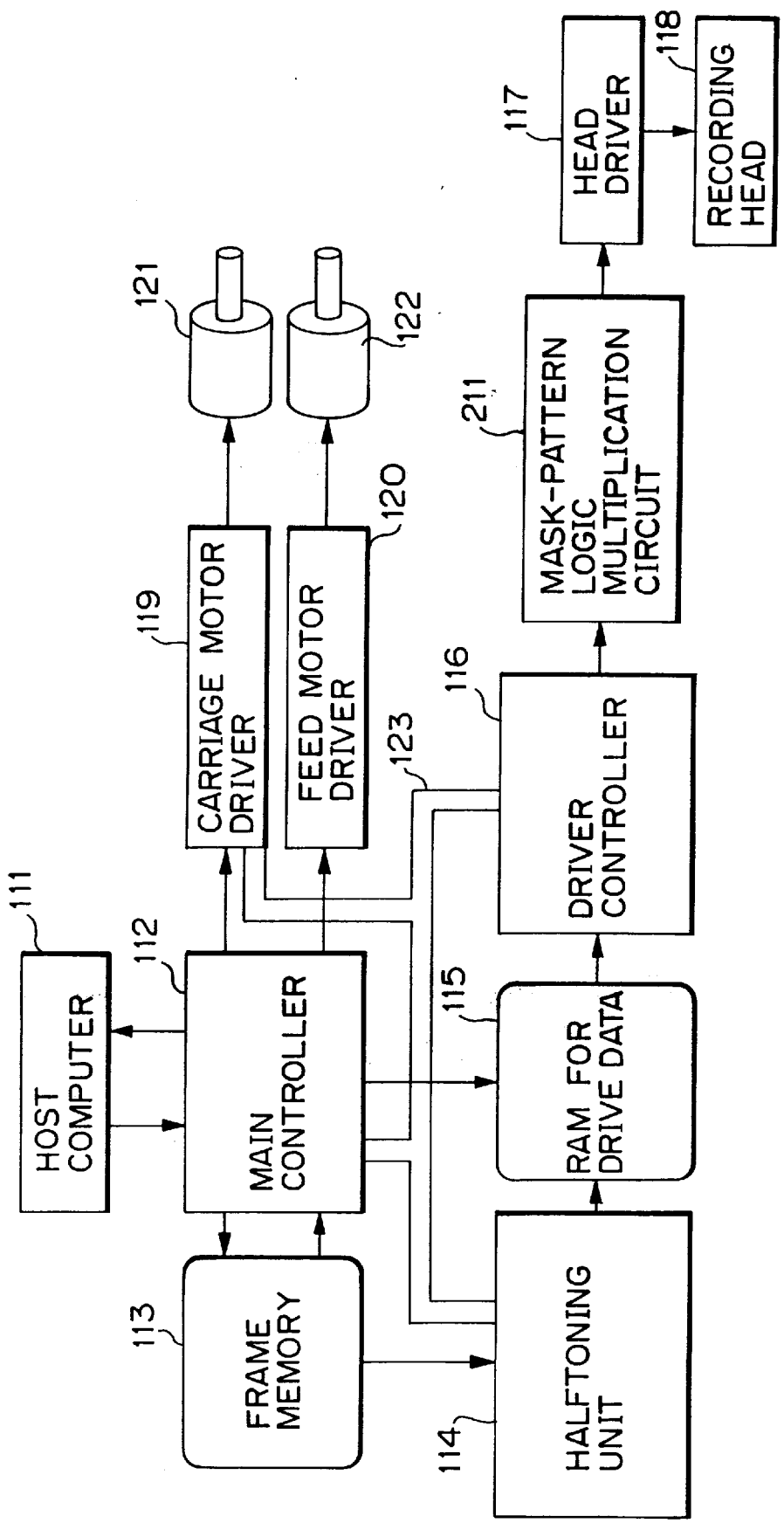
FIG. 9 is a block diagram which shows an embodiment of image data to be used in an ink jet recording method in accordance with the present invention (draft mode #2).

FIG. 9 is a block diagram for explaining a control mechanism of the ink jet recording apparatus that performs the multi-drop process in accordance with the present invention. In FIG. 9, the same reference numbers as that of FIG. 8 of the first embodiment denote the same constituents. In this embodiment, the normal mode and the third draft mode #3 shown in FIG. 4 are employed.

In FIG. 9, reference numeral 211 denotes a mask pattern logic multiplication circuit consisting of a mask pattern unit for masking drive data and a logic circuit unit for outputting a result of logic multiplication for each of the drive data and the mask patterns at the period of transferring data from the drive data RAM 115 to the recording head 118 through the driver controller 116. Usually, the drive data by-passes the mask pattern logical multiplication circuit 211.

In the case that an instruction of printing the image with the high-speed printing mode (i.e., draft mode) is provided from the host computer 111 to the main controller 112, the following events occur. The high-speed printing mode is the draft mode that performs the highest speed printing. The main controller 112 sends instructions to the devices to specify their initial conditions. That is, (i) an instruction of performing a bi-level halftoning processing (0–1 level for one pixel) is provided to the halftoning unit 114;

(ii) an instruction of performing a printing movement (one droplet for one pixel) is provided to the driver controller 116;

(iii) an instruction of moving the carriage at a six-times higher printing speed compared with that of the normal one to the carriage motor driver 119 (i.e., a painting rate of about 1,270 mm/second which is six times as high as the normal speed of about 211.7 mm/second because of the normal condition in which three droplets are provided in 400 dpi with a frequency of 10 kHz for each droplet); and (iv) an instruction of masking the drive data to the mask pattern unit and the logic circuit unit 211. In this embodiment, the mask pattern is created as a cross stripes pattern (i.e., a checkered pattern) of pixels as explained in the related art. That is, the initial condition is determined so that each orifice ejects ink droplets alternately against each pixel in a longitudinal row (i.e., 32 pixels) to be printed by the recording head. The initial condition can be determined by the main controller 112 through the control line 123.

A printing process and a data processing process in the condition of using the above draft mode will be described.

Firstly, the host computer 111 sends an instruction of using the draft mode in the recording process to the main controller 112. After the initialization, the main controller 112 sends a signal of requesting print data to the host computer 111. The print data may be image data (individual data corresponding to each pixel) and/or code data such as characters. It is also possible to use the print data as a command of ending the print. In this embodiment, the print data is provided as image data that consists of individual data corresponding to each pixel. That is, the main computer 111 transfers 8 bit (256-level gray scale) data for each pixel in order along an image raster direction to the main controller 112. The frame memory 113 stores each pixel data in a raster group for a while. Then the main controller 112 transfers the data stored in the frame memory 113 to the halftoning unit 114 for every pixel. In this unit 114, the bi-level halftoning is performed in accordance with the parameters in the initial set-up, and then 1 bit data for each pixel is transferred into the drive data RAM 115. When the print data corresponding to the number of the nozzles of the recording head (in this embodiment, 32 nozzles) is stored in the drive data RAM 115, the main controller 112 concludes that a printing movement is being ready to start and then it sends print instructions into each device. According to the print instructions, the carriage motor driver 119 is initialized to shift its position at a rate of 1,270 mm/second, while the driver controller 116 is initialized so as to perform the steps of: reading 1 bit data for one pixel from the drive data RAM; transferring 1 bit data for one pixel into the recording head; providing one heat pulse for one pixel to the orifice; and masking the drive data to be transferred to the recording head by the mask pattern unit and logic circuit unit 211 during the period of transferring each data. In the present embodiment, that is, the image is formed by ejecting one droplet for printing each pixel that originally requires three droplets. In the present embodiment, consequently, only one droplet is provided for one pixel in spite of essentially requiring three droplets and also each pixel at each cross point does not receive any droplet in spite of existing the drive data thereof or not. That is, an ejection frequency of each orifice in the recording head is 10 kHz for two pixels in which one pixel is formed by one droplet, resulting that the carriage can be moved at a rate of 1,270 mm/second. In this case, the printed image is of a lower concentration compared with that of the standard printing. Therefore, it may be difficult to print and recognize the image in detail. However, it must be satisfied by the users because this kind of printing is mainly performed for the purpose of confirming an arrangement of printed matter on a page or the overall design thereof.

As described above, the present invention attains a high speed printing about six times as high as that of the conventional one and confirms an entire arrangement of the printed image or its overall design.

In the present embodiment, the halftoning unit 114 sets up the drive data against the bi-level data. However, it is also possible that the CPU or the like pictures the print data such as fonts to the drive data RAM 115.

In the above embodiments 1 and 2, the ink jet recording apparatus comprising a single recording head has been described for a simple and plain illustration of the present invention. Therefore, the color printing can be performed by easily modifying the construction in the above embodiments without departing from the invention. In this case, a plurality of recording heads corresponding to colors can be applied.

In the above embodiments, furthermore, the halftoning is performed so as to fit to the selected draft mode. Especially in the case of printing one droplet for one pixel, however, it is also possible to transfer each pixel's data to the drive data RAM by the same way as that of the general procedure. In this case, it is better to check the existence of the pixel's data during the period of transferring each pixel's data to the drive data RAM. When it is being presented, the data is transferred one time for one pixel.

The present invention achieves distinct effect when applied to a recording head or a recording apparatus which has means for generating thermal energy such as electrothermal transducers or laser light, and which causes changes in ink by the thermal energy so as to eject ink. This is because such a system can achieve a high density and high resolution recording.

A typical structure and operational principle thereof is disclosed in U.S. Pat. Nos. 4,723,129 and 4,740,796, and it is preferable to use this basic principle to implement such a system. It is particularly suitable for the on-demand type apparatus. This is because the on-demand type apparatus has electrothermal transducers, each disposed on a sheet or liquid passage that retains liquid (ink), and operates as follows: first, one or more drive signals are applied to the electrothermal transducers to cause thermal energy corresponding to recording information; second, the thermal energy induces sudden temperature rise that exceeds the nucleate boiling so as to cause the film boiling on heating portions of the recording head; and third, bubbles are grown in the liquid (ink) corresponding to the drive signals. By using the growth and collapse of the bubbles, the ink is expelled from at least one of the ink ejection orifices of the head to form one or more ink drops. The drive signal in the form of a pulse is preferable because the growth and collapse of the bubbles can be achieved instantaneously and suitably by this form of drive signal. As a drive signal in the form of a pulse, those described in U.S. Pat. Nos. 4,463,359 and 4,345,262 are preferable. In addition, it is preferable that the rate of temperature rise of the heating portions described in U.S. Pat. No. 4,313,124 be adopted to achieve better recording.

U.S. Pat. Nos. 4,558,333 and 4,459,600 disclose the following structure of a recording head, which is incorporated to the present invention: this structure includes heating portions disposed on bent portions in addition to a combination of the ejection orifices, liquid passages and the electrothermal transducers disclosed in the above patents. Moreover, the present invention can be applied to structures disclosed in Japanese Patent Application Laid-open Nos. 123670/1984 and 138461/1984 in order to achieve similar effects. The former discloses a structure in which a slit common to all the electrothermal transducers is used as ejection orifices of the electrothermal transducers, and the latter discloses a structure in which openings for absorbing pressure waves caused by thermal energy are formed corresponding to the ejection orifices. Thus, irrespective of the type of the recording head, the present invention can achieve recording positively and effectively.

The present intention can be also applied to a so-called full-line type recording head whose length equals the maximum length across a recording medium. Such a recording head may consists of a plurality of recording heads combined together, or one integrally arranged recording head.

In addition, the present invention can be applied to various serial type recording heads: a recording head fixed to the main assembly of a recording apparatus; a conveniently replaceable chip type recording head which, when loaded on the main assembly of a recording apparatus, is electrically connected to the main assembly, and is supplied with ink therefrom; and a cartridge type recording head integrally including an ink reservoir.

It is further preferable to add a recovery system, or a preliminary auxiliary system for a recording head as a constituent of the recording apparatus because they serve to make the effect of the present invention more reliable. As embodiments of the recovery system, are a capping means and a cleaning means for the recording head, and a pressure or suction means for the recording head. As embodiments of the preliminary auxiliary system, are a preliminary heating means utilizing electrothermal transducers or a combination of other heater elements and the electrothermal transducers, and a means for carrying out preliminary ejection of ink independently of the ejection for recording. These systems are effective for reliable recording.

The number and type of recording heads to be mounted on a recording apparatus can be also changed. For embodiment, only one recording head corresponding to a single color ink, or a plurality of recording heads corresponding to a plurality of inks different in color or concentration can be used. In other words, the present invention can be effectively applied to an apparatus having at least one of the monochromatic, multi-color and full-color modes. Here, the monochromatic mode performs recording by using only one major color such as black. The multi-color mode carries out recording by using different color inks, and the full-color mode performs recording by color mixing.

Furthermore, although the above-described embodiments use liquid ink, inks that are liquid when the recording signal is applied can be used: for embodiment, inks can be employed that solidify at a temperature lower than the room temperature and are softened or liquefied in the room temperature. This is because in the ink jet system, the ink is generally temperature adjusted in a range of 30° C.–70° C. so that the viscosity of the ink is maintained at such a value that the ink can be ejected reliably.

In addition, the present invention can be applied to such apparatus where the ink is liquefied just before the ejection by the thermal energy as follows so that the ink is expelled from the orifices in the liquid state, and then begins to solidify on hitting the recording medium, thereby preventing the ink evaporation: the ink is transformed from solid to liquid state by positively utilizing the thermal energy which would otherwise cause the temperature rise; or the ink, which is dry when left in air, is liquefied in response to the thermal energy of the recording signal. In such cases, the ink may be retained in recesses or through holes formed in a porous sheet as liquid or solid substances so that the ink faces the electrothermal transducers as described in Japanese Patent Application Laid-open Nos. 56817/1979 or 71260/1985. The present invention is most effective when it uses the film boiling phenomenon to expel the ink.

Furthermore, the ink jet recording apparatus of the present invent on can be employed not only as an image output terminal of an information processing device such as a computer, but also as an output device of a copying machine including a reader, and as an output device of a facsimile apparatus having a transmission and receiving function.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

The present invention has been described in detail with respect to preferred embodiments and it will now be apparent that changes and modifications may be made without departing from the invention in its broader aspects, and it is the intention, therefore, in the appended claims to cover all such changes and modifications as fall within the true spirit of the invention.

What is claimed is:

1. An ink jet recording method for recording an image consisting of a plurality of pixels on a recording medium by using recording means that ejects at least one ink droplet to form one pixel on the recording medium, where the image is a multi-leveled image having a gradation which is determined by a number of ink droplets placed on top of one another at the substantially same location for a pixel on the recording medium, said method comprising:

selecting between and performing one of (i) a normal pixel recording step for forming the image in a normal mode that uses a number of ink droplets for each pixel to be required for obtaining the gradation, wherein, when more than one ink droplet is used to achieve a gradation for a pixel, the ink droplets are placed on top of one another at the substantially same location for the pixel, and (ii) a draft pixel recording step for forming the image in a draft mode that uses one ink droplet for each pixel regardless of the number of ink droplets for each pixel to be required for obtaining the gradation in the normal mode, wherein, when one or more than one ink droplet is used to achieve a gradation for a pixel in the normal mode, one ink droplet is placed on the recording medium for the pixel in the draft mode, and when no ink droplet is required for a pixel no ink droplet is placed on the recording medium for the pixel.

2. A method as claimed in claim 1, wherein all of the plurality of pixels in the image are recorded on the recording medium by said draft pixel recording step.

3. A method as claimed in claim 1, wherein a predetermined part of the pixels in the image is recorded on the recording medium by said draft pixel recording step.

4. A method as claimed in claim 1, wherein said draft pixel recording step is performed when a draft mode printing is selected.

5. A method as claimed in claim 1, wherein a rate of shifting a position of the recording medium is determined in accordance with the number of ink droplets elected per pixel.

6. A method as claimed in claim 1, wherein the recording means is an ink jet recording head that employs an electrothermal transducer for ejecting ink droplets by generating a film boiling in ink by thermal energy, as means for generating energy for ejecting ink droplets.

7. A method as claimed in claim 1, wherein the recording means ejects ink droplets of different inks corresponding to different colors, respectively.

8. A printed product obtained by performing an ink jet recording method for recording an image consisting of a plurality of pixels on a recording medium by using recording means that ejects at least one ink droplet to form one pixel on the recording medium, where the image is a multi-leveled image having a gradation determined by a number of ink droplets placed on top of one another at the substantially same location for a pixel on the recording medium, said ink jet recording method comprising:

selecting between and performing one of (i) a normal pixel recording step for forming the image in a normal mode that uses a number of ink droplets for each pixel to be required for obtaining the gradation, wherein, when more than one ink droplet is used to achieve a gradation for a pixel, the ink droplets are placed on top of one another at the substantially same location for the pixel, and (ii) a draft pixel recording step for forming the image in a draft mode that uses one ink droplet for each pixel regardless of the number of ink droplets for each pixel to be required for obtaining the gradation in the normal mode, wherein, when one or more than one ink droplet is used to achieve a gradation for a pixel in the normal mode, one ink droplet is placed on the recording medium for the pixel in the draft mode, and when no ink droplet is required for a pixel no ink droplet is placed on the recording medium for the pixel.

9. An ink jet recording apparatus using an ink jet recording method for recording an image consisting of a plurality of pixels on a recording medium by using recording means that ejects at least one ink droplet to form one pixel on the recording medium, where the image is a multi-leveled image having a gradation determined by a number of ink droplets placed on top of one another at the substantially same location for a pixel on the recording medium, said ink jet recording apparatus comprising:

normal pixel recording means for forming the image in a normal mode that uses a number of ink droplets for each pixel to be required for obtaining the gradation, wherein, when more than one ink droplet is used to achieve a gradation for a pixel, the ink droplets are placed on top of one another at the substantially same location for the pixel; and draft pixel recording means for forming the image in a draft mode that uses one ink droplet for each pixel regardless of the number of ink droplets for each pixel to be required for obtaining the gradation in the normal mode, wherein, when one or more than one ink droplet is used to achieve a gradation for a pixel in the normal mode, one ink droplet is placed on the recording medium for the pixel in the draft mode, and when no ink droplet is required for a pixel no ink droplet is placed on the recording medium for the pixel.

10. An ink jet recording apparatus as claimed in claim 9, wherein all of the pixels in the image are recorded on the recording medium by said draft pixel recording means.

11. An ink jet recording apparatus as claimed in claim 9, wherein a part of the pixels in the image is recorded on the recording medium by said draft pixel recording means.

12. An ink jet recording apparatus as claimed in claim 9, wherein said draft pixel recording means operates when a draft mode printing is selected.

13. An ink jet recording apparatus as claimed in claim 9, wherein a speed of shifting a position of the recording medium is determined in accordance with the number of ink droplets ejected per pixel.

14. An ink jet recording apparatus as claimed in claim 9, wherein the recording means is an ink jet recording head that employs an electrothermal transducer for ejecting ink droplets by generating a film boiling in the ink by thermal energy, as means for generating energy for ejecting ink.

15. An ink jet recording apparatus as claimed in claim 9, wherein the recording means ejects ink droplets of different inks corresponding to different colors, respectively.

16. An information-processing system using an ink jet recording apparatus having transfer means for transferring a recording medium and recording means for performing an ink jet recording method for recording an image consisting of a plurality of pixels on a recording medium by ejecting at least one ink droplet to form one pixel on the recording medium, where the image is a multi-leveled image having a gradation determined by a number of ink droplets placed on top of one another at the substantially same location for a pixel on the recording medium, wherein the ink jet recording apparatus used in said system comprises (a) normal pixel recording means for forming the image in a normal mode that uses a number of ink droplets for each pixel to be required for obtaining the gradation, wherein, when more than one ink droplet is used to achieve a gradation for a pixel, the ink droplets are placed on top of one another at the substantially same location for the pixel, and (b) draft pixel recording means for forming the image in a draft mode that uses one ink droplet for each pixel regardless of the number of ink droplets for each pixel to be required for obtaining the gradation in the normal mode, wherein, when one or more than one ink droplet is used to achieve a gradation for a pixel in the normal mode, one ink droplet is placed on the recording medium for the pixel in the draft mode, and when no ink droplet is required for a pixel no ink droplet is placed on the recording medium for the pixel.

17. A system as claimed in claim 16, wherein all of the pixels in the image are recorded on the recording medium by said draft pixel recording means.

18. A system as claimed in claim 16, wherein a predetermined part of the pixels in the image is recorded on the recording medium by said draft pixel recording means.

19. A system as claimed in claim 16, wherein said draft pixel recording means operates when a draft mode printing is selected.

20. A system as claimed in claim 16, wherein a velocity of shifting a position of the recording medium is determined in accordance with the number of ink droplets elected per pixel.

21. A system as claimed in claim 16, wherein the recording means is an ink jet recording head that employs an electrothermal transducer for ejecting ink droplets by generating a membrane boiling in the ink by thermal energy, as means for generating energy for ejecting ink.

22. An ink jet recording method for forming a multilevel image composed of a plurality of pixels on a recording medium, each pixel being formed by at least one ink droplet placed on top of one another at the substantially same location, said method comprising the steps of:
   providing a recording head for ejecting ink;
   inputting recording data including gray level data;
   allocating a number of ink droplets for each pixel in accordance with the inputted recording data including the gray level data, in which a maximum number of ink droplets to be allocated is N (>1); and
   forming an image by constituting each pixel by ejecting ink droplets from the recording head during a period of performing a scanning movement of the recording head with respect to the recording medium, said image forming step having:
      selecting between and performing one of
         (i) a normal mode for forming the multilevel image by constituting each pixel by ejecting ink droplets from the recording head, in which a number of ink droplets is allocated in said allocating step, wherein, when more than one ink droplet is used to achieve a gradation for a pixel, the ink droplets are placed on top of one another at the substantially same location for the pixel, and
         (ii) a draft mode for forming the multilevel image by constituting each pixel by ejecting one ink droplet from the recording head, wherein, when one or more than one ink droplet is used to achieve a gradation for a pixel in the normal mode, one ink droplet is placed on the recording medium for the pixel in the draft mode, and when no ink droplet is required for a pixel no ink droplet is placed on the recording medium for the pixel.

23. An ink jet recording method as claimed in claim 22, wherein said allocating step allocates one ink droplet for each pixel in the draft mode, and said image forming step forms the multilevel image with each pixel constituted by one ink droplet allocated by said allocating step.

24. An ink jet recording method as claimed in claim 22, wherein said image forming step performs a scanning movement of the recording head in the draft mode at a higher speed compared with a scanning movement of the recording head in the normal mode.

25. An ink jet recording method as claimed in claim 24, wherein said image forming step performs a scanning movement of the recording head at a speed corresponding to the maximum number of ink droplets to be allocated for each pixel.

26. An ink jet recording method as claimed in claim 22, wherein the recording head ejects ink by using thermal energy.

27. An ink jet recording method as claimed in claim 22, wherein the recording head ejects a plurality of inks.

28. An ink jet recording apparatus using a recording head that ejects ink to form a multilevel image composed of a plurality of pixels on a recording medium, in which each pixel is formed by at least one ink droplet placed on top of one another at the substantially same location, said apparatus comprising:
   input means for inputting recording data including a gray level data;
   N+1 leveling means for allocating a number of ink droplets for each pixel in accordance with the inputted recording data including the gray level data, in which a maximum number of ink droplets to be allocated is N (>1);
   scanning means for performing a scanning movement of the recording head with respect to a recording medium; and
   image forming means for forming the multilevel image for constructing each pixel by ejecting ink droplets from the recording head during a scanning period of performing a scanning movement of the recording head by said scanning means, wherein said image forming means performs the image formation by selecting between and performing one of:
      (i) a normal mode for forming the multilevel image by constituting each pixel by ejecting ink droplets from the recording head, in which a number of ink droplets is allocated by said N+1 leveling means, wherein, when more than one ink droplet is used to achieve a gradation for a pixel, the ink droplets are placed on top of one another at the substantially same location for the pixel; and
      (ii) a draft mode for forming the multilevel image by constituting each pixel by ejecting one ink droplet from the recording head, wherein, when one or more than one ink droplet is used to achieve a gradation for a pixel in the normal mode, one ink droplet is placed on the recording medium for the pixel in the draft mode, and when no ink droplet is required for a pixel no ink droplet is placed on the recording medium for the pixel.

29. An ink jet recording apparatus as claimed in claim 28, further comprising:
   M+1 leveling means for allocating a number of ink droplets for each pixel in accordance with the inputted recording data including the gray level data, in which a maximum number of ink droplets to be allocated is M (<N),
   wherein said image forming means forms the multilevel image by constituting each pixel by ejecting ink droplets from the recording head, in which a number of said ink droplets is allocated by said M+1 leveling means.

30. An ink jet recording apparatus as claimed in claim 29, wherein M is equal to 1.

31. An ink jet recording apparatus as claimed in claim 30, further comprising:
   mask means for masking the ink droplets allocated for each pixel to be formed by said image forming means.

32. An ink jet recording apparatus as claimed in claim 28, wherein a scanning rate of said scanning means is set to a predetermined speed in accordance with the maximum number of ink droplets which is allocated for each pixel to be formed by said image forming means.

33. An ink jet recording apparatus as claimed in claim 28, wherein the recording head ejects ink by using thermal energy.

34. An ink jet recording apparatus as claimed in claim 28, wherein the recording head ejects a plurality of inks.

35. An ink jet recording apparatus as claimed in claim 28, wherein the recording head is removably mounted.

36. An ink jet recording apparatus as claimed in claim 35, further comprising a carriage on which the recording head is mounted.

37. An ink jet recording apparatus as claimed in claim 28, further comprising transfer means for shifting a position of a recording medium to be recorded on by the recording head.

38. An ink jet recording apparatus as claimed in claim 28, wherein said apparatus is applied to a copying machine.

39. An ink jet recording apparatus as claimed in claim 28, wherein said apparatus is applied to a facsimile machine.

40. An ink jet recording apparatus as claimed in claim 28, wherein said apparatus is applied to a terminal of a computer.

41. An ink jet recording method for recording an image consisting of a plurality of pixels on a recording medium by using recording means that ejects at least one ink droplet to form one pixel on the recording medium, where the image is a multi-leveled image having a gradation which is determined by a number of ink droplets placed on top of one another at the substantially same location for a pixel on the recording medium, said method comprising:
selecting between and performing one of
(i) a normal pixel recording step for forming the image in a normal mode, wherein a number of ink droplets for a pixel required for obtaining a gradation for the pixel is selected from a range having a maximum number of ink droplets, and wherein, when more than one ink droplet is used to achieve a gradation for a pixel, the ink droplets are placed on top of one another at the substantially same location for the pixel, and
(ii) a draft pixel recording step for forming the image in a draft mode, wherein a number of ink droplets for a pixel is selected from a range having a maximum number of one ink droplet, and wherein, when one or more than one ink droplet is used to achieve a gradation for a pixel in the normal mode, one ink droplet is placed on the recording medium for the pixel in the draft mode, and when no ink droplet is required for a pixel no ink droplet is placed on the recording medium for the pixel.

42. A printed product obtained by performing an ink jet recording method for recording an image consisting of a plurality of pixels on a recording medium by using recording means that ejects at least one ink droplet to form one pixel on the recording medium, where the image is a multi-leveled image having a gradation determined by a number of ink droplets placed on top of one another at the substantially same location for a pixel on the recording medium, said ink jet recording method comprising:
selecting between and performing one of
(i) a normal pixel recording step for forming the image in a normal mode, wherein a number of ink droplets for a pixel required for obtaining a gradation for the pixel is selected from a range having a maximum number of ink droplets, and wherein, when more than one ink droplet is used to achieve a gradation for a pixel, the ink droplets are placed on top of one another at the substantially same location for the pixel, and
(ii) a draft pixel recording step for forming the image in a draft mode, wherein a number of ink droplets for a pixel is selected from a range having a maximum number of one ink droplet, and wherein, when one or more than one ink droplet is used to achieve a gradation for a pixel, one ink droplet is placed on the recording medium for the pixel in the draft mode, and when no ink droplet is required for a pixel no ink droplet is placed on the recording medium for the pixel.

43. An ink jet recording apparatus using an ink jet recording method for recording an image consisting of a plurality of pixels on a recording medium by using recording means that ejects at least one ink droplet to form one pixel on the recording medium, where the image is a multi-leveled image having a gradation determined by a number of ink droplets placed on top of one another at the substantially same location for a pixel on the recording medium, said ink jet recording apparatus comprising:
normal pixel recording means for forming the image in a normal mode, wherein a number of ink droplets for a pixel required for obtaining a gradation for the pixel is selected from a range having a maximum number of ink droplets, and wherein, when more than one ink droplet is used to achieve a gradation for a pixel, the ink droplets are placed on top of one another at the substantially same location for the pixel; and
draft pixel recording means for forming the image in a draft mode, wherein a number of ink droplets for a pixel is selected from a range having a maximum number of one ink droplet, and wherein, when one or more than one ink droplet is used to achieve a gradation for a pixel in the normal mode, one ink droplet is placed on the recording medium for the pixel in the draft mode, and when no ink droplet is required for a pixel no ink droplet is placed on the recording medium for the pixel.

44. An information-processing system using an ink jet recording apparatus having transfer means for transferring a recording medium and recording means for performing an ink jet recording method for recording an image consisting of a plurality of pixels on a recording medium by ejecting at least one ink droplet to form one pixel on the recording medium, where the image is a multi-leveled image having a gradation determined by a number of ink droplets placed on top of one another at the substantially same location for a pixel on the recording medium, wherein the ink jet recording apparatus used in said system comprises (a) normal pixel recording means for forming the image in a normal mode, wherein a number of ink droplets for a pixel required for obtaining a gradation for the pixel is selected from a range having a maximum number of ink droplets, and wherein, when more than one ink droplet is used to achieve a gradation for a pixel, the ink droplets are placed on top of one another at the substantially same location for the pixel, and (b) draft pixel recording means for forming the image in a draft mode, wherein a number of ink droplets for a pixel is selected from a range having a maximum number of one ink droplet, and wherein, when one or more than one ink droplet is used to achieve a gradation for a pixel in the normal mode, one ink droplet is placed on the recording medium for the pixel in the draft mode, and when no ink droplet is required for a pixel no ink droplet is placed on the recording medium for the pixel.

45. An ink jet recording method for forming a multilevel image composed of a plurality of pixels on a recording medium, each pixel being formed by at least one ink droplet placed on top of one another at the substantially same location, said method comprising the steps of:

provideng a recording head for ejecting ink;

inputting recording data including gray level data;

allocating a number of ink droplets for each pixel in accordance with the inputted recording data including the gray level data, in which a maximum number of ink droplets to be allocated is N (>1); and forming an image by constituting each pixel by ejecting ink droplets from the recording head during a period of performing a scanning movement of the recording head with respect to the recording medium, said image forming step having:

selecting between and performing one of (i) a normal mode for forming the multilevel image by constituting each pixel by ejecting ink droplets from the recording head, in which a number of ink droplets allocated in said allocating step for a pixel is selected from a range having the maximum number of ink droplets N, and wherein, when more than one ink droplet is used to achieve a gray level for a pixel, the ink droplets are placed on top of one another at the substantially same location for the pixel, and (ii) a draft mode for forming the multilevel image by constituting each pixel by ejecting ink droplets from the recording head, in which a number of ink droplets for a pixel is selected from a range having a maximum number of one ink droplet, and wherein, when one or more than one ink droplet is used to achieve a gray level for a pixel in the normal mode, one ink droplet is placed on the recording medium for the pixel in the draft mode, and when no ink droplet is required for a pixel no ink droplet is placed on the recording medium for the pixel.

46. An ink jet recording apparatus using a recording head that ejects ink to form a multilevel image composed of a plurality of pixels on a recording medium, in which each pixel is formed by at least one ink droplet placed on top of one another at the substantially same location, said apparatus comprising:

input means for inputting recording data including a gray level data;

N+1 leveling means for allocating a number of ink droplets for each pixel in accordance with the inputted recording data including the gray level data, in which a maximum number of ink droplets to be allocated is N (>1);

scanning means for performing a scanning movement of the recording head with respect to a recording medium; and image forming means for forming the multilevel image for constructing each pixel by ejecting ink droplets from the recording head during a scanning period of performing a scanning movement of the recording head by said scanning means, wherein said image forming means performs the image formation by selecting between and performing one of:

(i) a normal mode for forming the multilevel image by constituting each pixel by ejecting ink droplets from the recording head, in which a number of ink droplets allocated by said N+1 leveling means for the pixel is selected from a range having the maximum number of ink droplets N, and wherein, when more than one ink droplet is used to achieve a gray level for a pixel, the ink droplets are placed on top of one another at the substantially same location for the pixel; and (ii) a draft mode for forming the multilevel image by constituting each pixel by ejecting ink droplets from the recording head, in which a number of ink droplets for a pixel is selected from a range having a maximum number of one ink droplet, and wherein, when one or more than one ink droplet is used to achieve a gray level for a pixel in the normal mode, one ink droplet is placed on the recording medium for the pixel in the draft mode, and when no ink droplet is required for a pixel no ink droplet is placed on the recording medium for the pixel.

47. An ink jet recording method for recording an image consisting of a plurality of pixels on a recording medium by using a recording head that ejects at least one ink droplet to form one pixel on the recording medium, where the image is a multi-leveled image having a gradation which is determined by a number of ink droplets per pixel with at least portions of the ink droplets overlapping each other on the recording medium, said method comprising:

selecting between and performing one of (i) a normal pixel recording step for forming the image in a normal mode that uses a number of ink droplets for each pixel to be required for obtaining the gradation, wherein, when more than one ink droplet is used to achieve a graduation for a pixel, the ink droplets are placed for the pixel with at least portions of the ink droplets overlapping each other on the recording medium, and (ii) a draft pixel recording step for forming the image in a draft mode that uses a single number of ink droplets for each pixel regardless of the number of ink droplets for each pixel to be required for obtaining the gradation in the normal mode, wherein, one or more than one ink droplet is used to achieve a gradation for a pixel in the normal mode, a single number of ink droplets is placed on the recording medium for the pixel in the draft mode, and when no ink droplet is required for a pixel, no ink droplet is placed on the recording medium for the pixel.

48. An ink jet recording method as claimed in claim 47, wherein the recording head ejects ink by using thermal energy.

49. An ink jet recording method as claimed in claim 47, wherein the single number is one of the number one or a greater number.

50. An ink jet recording apparatus using an ink jet recording method for recording an image consisting of a plurality of pixels on a recording medium by using a recording head that ejects at least one ink droplet to form one pixel on the recording medium, where the image is a multi-leveled image having a gradation determined by a number of ink droplets per pixel with at least portions of the ink droplets overlapping each other on the recording medium, said ink jet recording apparatus comprising:

normal pixel recording means for forming the image in a normal mode that uses a number of ink droplets for each pixel to be required for obtaining the gradation, wherein, when more than one ink droplet is used to achieve a gradation for a pixel, the ink droplets are placed for the pixel with at least portions of the ink droplets overlapping each other on the recording medium; and draft pixel recording means for forming the image in a draft mode that uses a single number of ink droplets for each pixel regardless of the number of ink droplets for each pixel to be required for obtaining the gradation in the normal mode, wherein, when one or more than one ink droplet is used to achieve a gradation for a pixel in the normal mode, a single number of ink droplets is placed on the recording medium for the pixel in the draft mode, and when no ink droplet is required for a pixel, no ink droplet is placed on the recording medium for the pixel.

51. An ink jet recording apparatus as claimed in claim 50, wherein the recording head ejects ink by using thermal energy.

52. An ink jet recording method as claimed in claim 50, wherein the single number is one of the number one or a greater number.

53. An ink jet recording method for recording an image consisting of a plurality of pixels on a recording medium by using a recording head that ejects at least one ink droplet to form one pixel on the recording medium, where the image is a multi-leveled image having a gradation which is determined by a number of ink droplets per pixel with at least portions of the ink droplets overlapping each other on the recording medium, said method comprising:

selecting between and performing one of
(i) a normal pixel recording step for forming the image in a normal mode, wherein a number of ink droplets for a pixel required for obtaining a gradation for the pixel is selected from a range having a maximum number of ink droplets, and wherein, when more than one ink droplet is used to achieve a gradation for a pixel, the ink droplets are placed for the pixel with at least portions of the ink droplets overlapping each other on the recording medium, and
(ii) a draft pixel recording step for forming the image in a draft mode, wherein a binary image is produced for a pixel, and wherein, when one or more than one ink droplet is used to achieve a gradation for a pixel in the normal mode, a single number of ink droplets is placed on the recording medium for the pixel in the draft mode, and when no ink droplet is required for a pixel, no ink droplet is placed on the recording medium for the pixel.

54. An ink jet recording method as claimed in claim 53, wherein the recording head ejects ink by using thermal energy.

55. An ink jet recording method as claimed in claim 53, wherein the single number is one of the number one or a greater number.

56. An ink jet recording apparatus using an ink jet recording method for recording an image consisting of a plurality of pixels on a recording medium by using a recording head that ejects at least one ink droplet to form one pixel on the recording medium, where the image is a multi-leveled image having a dradation determined by a number of ink droplets per pixel with at least poritons of the ink droplets overlapping each other on the recording medium, said ink jet recording apparatus comprising:

normal pixel recording means for forming the image in a normal mode, wherein a number of ink droplets for a pixel required for obtaining a gradation for the pixel is selected from a range having a maximum number of ink droplets, and wherein, when more than one ink droplet is used to achieve a gradation for a pixel, the ink droplets are placed for the pixel with at least portions of the ink droplets overlapping each other on the recording medium; and draft pixel recording means for forming the image in a draft mode, wherein a binary image is produced for a pixel, and wherein, when one or more than one ink droplet is used to achieve a gradation for a pixel in the normal mode, a single number of ink droplets is placed on the recording medium for the pixel in the draft mode, and when no ink droplet is required for a pixel, no ink droplet is placed on the recording medium for the pixel.

57. An ink jet recording apparatus as claimed in claim 56, wherein the recording head ejects ink by using thermal energy.

58. An ink jet recording method as claimed in claim 56, wherein the single number is one of the number one or a greater number.

* * * * *

UNITED STATES PATENT AND TRADEMARK OFFICE
CERTIFICATE OF CORRECTION

PATENT NO. : 6,099,102

DATED : August 8, 2000

INVENTOR(S) : TANAKA, ET AL.

It is certified that error appears in the above-identified patent and that said Letters Patent is hereby corrected as shown below:

COLUMN 2:
  Line 29, "resent" should read --recent--.
  Line 49, "the" (second occurrence) should be deleted.
  Line 59, "fields." should read --field.--.

COLUMN 3:
  Line 12, "as" should read --as,--.

COLUMN 5:
  Line 6, "according" should read --accordance--.
  Line 12, "other" should read --another--.

COLUMN 9:
  Line 25, "droplets" should read --droplet,--.

COLUMN 10:
  Line 16, "droplets," should read --droplet,--.

COLUMN 11:
  Line 66, "referred" should read --referred to--.

COLUMN 12:
  Line 40, "droplet" should read --droplets--.

UNITED STATES PATENT AND TRADEMARK OFFICE
CERTIFICATE OF CORRECTION

PATENT NO. : 6,099,102

DATED : August 8, 2000

INVENTOR(S) : TANAKA, ET AL.

It is certified that error appears in the above-identified patent and that said Letters Patent is hereby corrected as shown below:

```
COLUMN 13:
  Line 24, "stared" should read --stored--.
  Line 38, "according" should read --accordance--.

COLUMN 14:
  Line 2, "be now" should read --now be--.

COLUMN 16:
  Line 18, "existing the" should read --the existence of--.

COLUMN 17:
  Line 36, "be also" should read --also be--.
  Line 39, "consists" should read --consist--.
  Line 63, "be also" should read --also be--.

COLUMN 18:
  Line 33, "invent on" should read --invention--.

COLUMN 19:
  Line 20, the right margin should be closed up.
  Line 22, the left margin should be closed up.
  Line 25, "elected" should read --ejected--.

COLUMN 21:
  Line 12, "elected" should read --ejected--.
```

UNITED STATES PATENT AND TRADEMARK OFFICE
CERTIFICATE OF CORRECTION

PATENT NO. : 6,099,102

DATED : August 8, 2000

INVENTOR(S) : TANAKA, ET AL.

Page 3 of 3

It is certified that error appears in the above-identified patent and that said Letters Patent is hereby corrected as shown below:

<u>COLUMN 28:</u>
  Line 12, "dradation" should read --gradation--.

Signed and Sealed this

Seventeenth Day of April, 2001

Attest:

NICHOLAS P. GODICI

Attesting Officer   Acting Director of the United States Patent and Trademark Office